Feb. 22, 1927.
G. H. ALDRICH
1,618,160
BOLTLESS DEAD END CLAMP
Filed Oct. 21, 1926
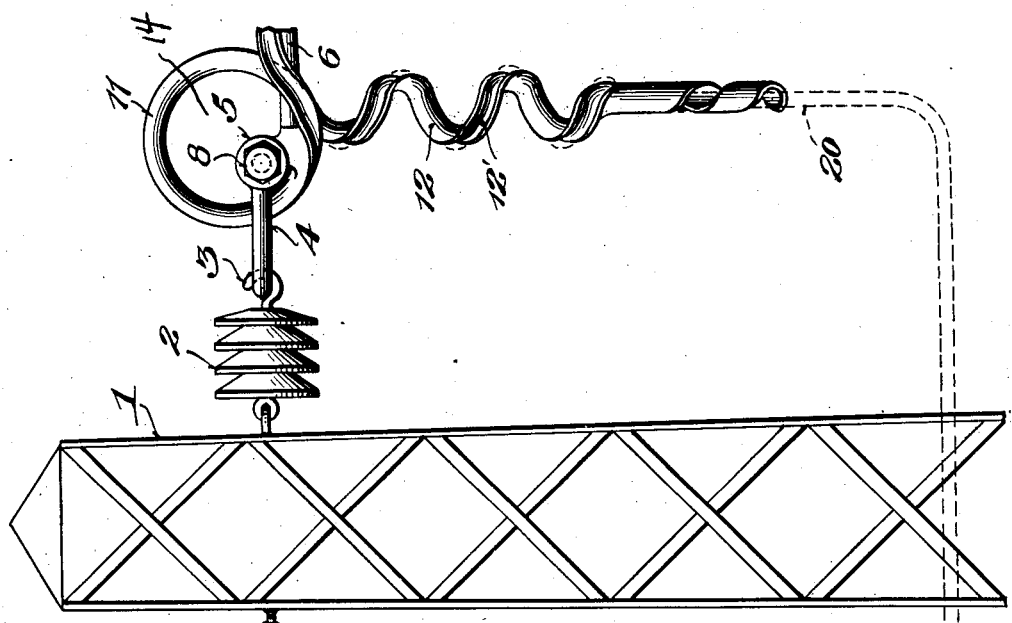
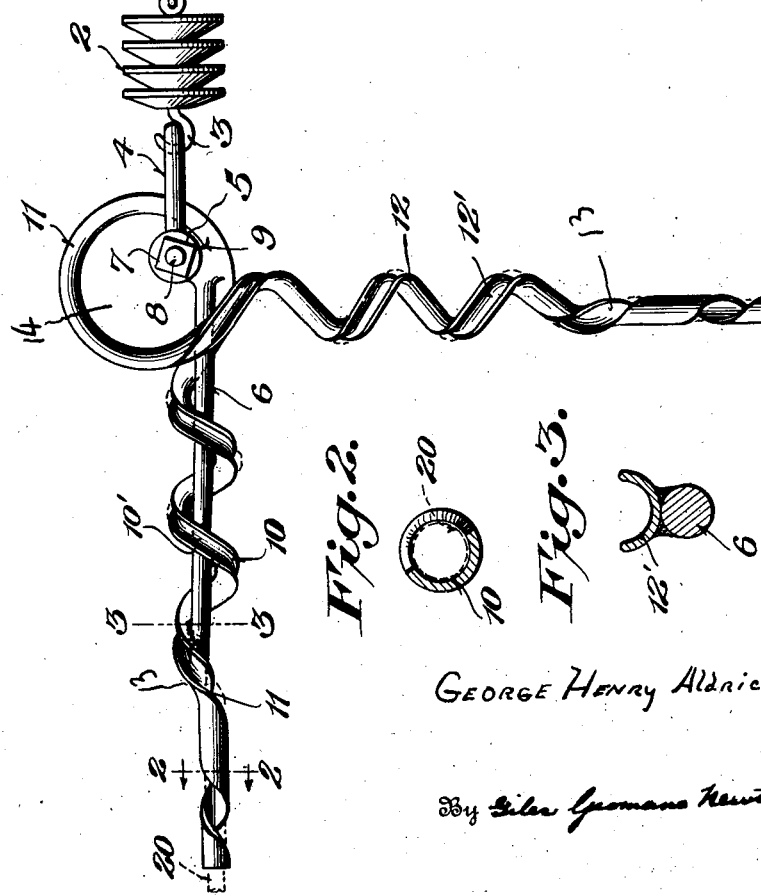
George Henry Aldrich Inventor
By Giles Gomans Newton
Attorney Patented Feb. 22, 1927.

1,618,160

UNITED STATES PATENT OFFICE.

GEORGE HENRY ALDRICH, OF HIGH POINT, NORTH CAROLINA.

BOLTLESS DEAD-END CLAMP.

Application filed October 21, 1926. Serial No. 143,041.

My invention relates to improvements in boltless dead-end clamps such as are used for hanging and supporting cables, especially those of soft metal such as aluminum, and has particular reference to a means for hanging and holding the cable to its support without the necessity of cutting the same.

Heretofore in supporting cables such as those of aluminum, great trouble and expense has been encountered because of the difficulty in affixing the cable to its clamp. In order to prevent slipping of the cable in its clamp, gripping pressure has been necessary beyond the compressive strength which the material of the cable could withstand with consequent injury to the metal thereof. Moreover, it was necessary to cut the cable at its support, fasten the free ends to the respective clamps and then splice the free ends again before the line could be continued. It is an object of my invention to devise a simple boltless, inexpensive clamp which will firmly grip and securely support a cable without slipping and which will obviate the necessity of cutting and splicing at dead-ends as has been heretofore necessary, thus greatly reducing the cost and time necessary in attaching the cable to its supports. By my invention cables of any metal, especially soft metals such as aluminum, are firmly held without slipping and without injury.

With the above and other objects in view which will become obvious or be pointed out in detail as the description proceeds, the invention resides in the novel details of construction and combination of parts hereinafter pointed out and claimed.

Reference is now had to the drawing forming a part of this specification, and in which—

Fig. 1 is an elevational view showing a form of my invention adapted for attaching dead-ends to insulators at the supporting tower, the size of the clamps being greatly exaggerated for the purpose of illustration.

Fig. 2 is a section taken on the line 2—2 of Fig. 1, and Fig. 3 is a section on line 3—3, Fig. 1.

The numeral 1 refers to any type of supporting structure such as a steel tower. 2, 2 are the insulators bearing securing means 3, 3 to which my clamps may be attached. This construction is, of course, old and well known, and forms no part of my invention.

Coming to the clamp proper the numeral 11 represents an elongated channeled member which in its preferred form is substantially semi-circular in cross-section as shown at Fig. 3. It will be understood, however, that any other shape of cross-section may be employed as long as it effectively grips the cable and holds the same. For example, with wire of any cross-section, such as square, a correspondingly shaped member 11 may be employed.

Said member, it will be noted, is flat at its respective ends. At substantially its mid-portion, member 11 is bent into a loop 14 of substantial proportions and the opposite ends of said member extend in angular relation to each other and may or may not be crossed. The respective ends which extend beyond the loop are twisted into a spiral or cork-screw shape with progressively decreasing diameters of spiral form from the loop outwardly, there being an equal number of turns or coils on each end. It will be also noted that the respective ends are twisted in opposite directions of rotation. This is deemed by me to be an important feature of my invention inasmuch as untwisting of the cable is thereby prevented and said cable caused to grip the clamp more securely. It will also be noted that the open side of the said member 11 as 10' and 12', is outward of the spiral for a purpose hereinafter to be explained.

The spiral or cork-screw shaped portion extends to the flattened part as at 13 where said part is twisted into a cylindrical shape having a helical opening about its periphery substantially as shown.

Numeral 20 indicates the incoming cable. In order to adapt the clamp to withstand the tension imposed by such cable a brace element, preferably a rod, 6, is fastened to the channeled members at one end as at 13, and at its other end to the inner periphery of loop 14. Any suitable means may be used to secure the respective ends of element 6 to the member 11, such as soldering or brazing. An eye 6ᵃ at the inner end of member 6 is received within a clevis 4 and a bolt 8 is passed through the clevis and eye and secured therein by a nut 7. This serves to pivotally connect the clevis and member 6. The clevis in turn is connected by securing means 3 to insulator 2. By this construction, it will be noted that the stress imposed by the incoming cable 20 is directly taken by element 6 and transmitted to clevis 4 and insulator 2.

Coming now to the use of my clamp, it will be noted that it is entirely unnecessary to cut the cable when attaching it to the clamp. The cable is first wound or twisted into member 11 through the helical opening at the incoming end and is then twisted to follow the spiral of member 11 and to fit snugly and engage frictionally in the channeled portion thereof. It will be seen that the open side of the channel is disposed outwardly for this purpose. The cable is then passed around loop 14 and is then twisted in an opposite direction and caused to lie snugly in the other spiraled end. By this feature of opposite rotation of spirals at the respective ends unwinding of the cable from its channeled support is prevented.

It will be noted moreover that for purpose of clarity I have limited my description to a single boltless, dead-end clamp. However, it will be obvious that where a change of direction is desired, an additional clamp is used as shown in Fig. 1 right hand side, and the cable passed from one clamp to the other without necessitating the cutting of the cable as heretofore explained. The number of clamps used depends upon the number of dead-ends, or changes of direction of line. The greater the number of coils the greater the friction engendered, with a corresponding increase of holding effect. The number of convolutions employed will be varied according to the stress upon the particular cable being anchored.

From the foregoing description it will be apparent that a clamp has been provided which is simple in construction and operation, and which possesses all the features enumerated in the statement of invention.

Various changes in shape, size, and arrangement of parts may be made in the form of the invention herein shown and described, without departing from the spirit of the invention or scope of the following claims.

Having described my invention what I desire to claim is:—

1. In a clamp, a channeled member, said member having a loop at its mid portion, its opposite ends being bent into spiral shape.

2. A clamp as per claim 1, said spirals being formed of progressively decreasing diameter from the loop outwardly.

3. In a device of the type described, an elongated channeled member, said member being bent to form a loop at substantially its mid portion, the opposite ends thereof being twisted into spiral form, whereby a cable may be caused to engage said channel throughout the length thereof, a brace rod, said rod being secured at one end to an end of said member and at its other end to said loop.

4. A device as per claim 3 in which the channel opens outwardly, whereby the cable may be threaded into the clamp without cutting.

5. A device as per claim 3, and a clevis attached to the inner end of said brace.

6. A cable holding device comprising a channeled element bent between its ends to form a loop and having its terminal portions bent into sinuous paths.

In testimony whereof I affix my signature.

GEORGE HENRY ALDRICH.